United States Patent
Coggio et al.

(10) Patent No.: US 7,473,462 B2
(45) Date of Patent: Jan. 6, 2009

(54) LOW REFRACTIVE INDEX FLUOROPOLYMER COMPOSITIONS HAVING IMPROVED COATING AND DURABILITY PROPERTIES

(75) Inventors: William D. Coggio, Hudson, WI (US); Thomas P. Klun, Lakeland, MN (US); George G. I. Moore, Afton, MN (US); Naiyong Jing, Woodbury, MN (US); Chuntao Cao, Woodbury, MN (US); Sharon Wang, Saint Paul, MN (US); Patricia M. Savu, Maplewood, MN (US); Lan H. Liu, Rosemount, MN (US); Joan M. Noyola, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/972,034

(22) Filed: Jan. 10, 2008

(65) Prior Publication Data

US 2008/0107907 A1    May 8, 2008

Related U.S. Application Data

(63) Continuation of application No. 11/026,614, filed on Dec. 30, 2004, now abandoned.

(51) Int. Cl.
*B32B 27/20* (2006.01)
*B32B 27/26* (2006.01)
*B32B 27/28* (2006.01)
*B32B 27/30* (2006.01)
*B32B 33/00* (2006.01)

(52) U.S. Cl. .................. 428/212; 428/331; 428/421; 428/422; 428/522

(58) Field of Classification Search .............. None
See application file for complete search history.

(56) References Cited

U.S. PATENT DOCUMENTS 3,250,808 A    5/1966   Moore, Jr. et al.

(Continued)

FOREIGN PATENT DOCUMENTS

EP    0161581    11/1985

(Continued)

OTHER PUBLICATIONS

Banks, R.E., Fluoropolymers; Organofluorine Chemistry-Principles and Commercial Applications, pp. 380-396; Plenum Press, New York and London.

(Continued)

*Primary Examiner*—Ramsey Zacharia
(74) *Attorney, Agent, or Firm*—Carolyn A. Fischer (57) ABSTRACT

A low refractive index composition that forms a low refractive index layer on an optical display is formed having a co-crosslinked interpenetrating polymer network of a fluoropolymer phase and an acrylate phase. The fluoropolymer phase is preferably formed from fluoropolymers based on THV or FKM and having either a degree of unsaturation and/or containing a reactive cure site monomer in its polymer backbone. The acrylate phase includes a multifunctional acrylate crosslinker, and more preferably includes a perfluoropolyether acrylate crosslinker. The formed low refractive index layer has improved interfacial adhesion to other layers or substrates contained in the optical display. Further, the mechanical strength and scratch resistance of the either of above low refractive index compositions can be further enhanced through the incorporation of surface functionalized inorganic particle into the formed layer.

15 Claims, 1 Drawing Sheet

U.S. PATENT DOCUMENTS

| | | |
|---|---|---|
| 3,676,192 A | 7/1972 | Hahn |
| 3,833,368 A | 9/1974 | Land et al. |
| 3,894,118 A | 7/1975 | Aronoff et al. |
| 4,000,356 A | 12/1976 | Weisgerber et al. |
| 4,214,060 A | 7/1980 | Apotheker et al. |
| 4,262,072 A | 4/1981 | Wendling et al. |
| 4,654,233 A | 3/1987 | Grant et al. |
| 4,697,026 A | 9/1987 | Lee et al. |
| 4,803,147 A | 2/1989 | Mueller et al. |
| 4,855,184 A | 8/1989 | Klun et al. |
| 5,003,008 A | 3/1991 | Kobayashi |
| 5,148,511 A | 9/1992 | Savu et al. |
| 5,214,100 A | 5/1993 | Abele et al. |
| 5,476,717 A | 12/1995 | Floch |
| 5,733,981 A | 3/1998 | Coggio et al. |
| 5,846,650 A | 12/1998 | Ko et al. |
| 6,080,487 A | 6/2000 | Coggio et al. |
| 6,132,861 A | 10/2000 | Kang et al. |
| 6,224,949 B1 | 5/2001 | Wright et al. |
| 6,238,798 B1 | 5/2001 | Kang et al. |
| 6,245,833 B1 | 6/2001 | Kang et al. |
| 6,254,973 B1 | 7/2001 | Yoshida et al. |
| 6,270,901 B1 | 8/2001 | Parsonage et al. |
| 6,271,326 B1 | 8/2001 | Nishikawa et al. |
| 6,299,799 B1 | 10/2001 | Craig et al. |
| 6,343,865 B1 | 2/2002 | Suzuki |
| 6,346,300 B1 | 2/2002 | Ruepping |
| 6,346,328 B1 | 2/2002 | Parsonage et al. |
| 6,379,788 B2 | 4/2002 | Choi et al. |
| 6,429,249 B1 | 8/2002 | Chen et al. |
| 6,464,822 B1 | 10/2002 | Choi et al. |
| 6,497,961 B2 | 12/2002 | Kang et al. |
| 6,572,693 B1 | 6/2003 | Wu et al. |
| 6,630,407 B2 | 10/2003 | Keil et al. |
| 6,680,357 B1 | 1/2004 | Hedhli et al. |
| 6,685,793 B2 | 2/2004 | Jing |
| 6,734,227 B2 | 5/2004 | Jing et al. |
| 6,753,087 B2 | 6/2004 | Jing et al. |
| 6,794,469 B2 | 9/2004 | Obayashi et al. |
| 7,101,618 B2 | 9/2006 | Coggio et al. |
| 2001/0033934 A1 | 10/2001 | Port et al. |
| 2001/0050741 A1 | 12/2001 | Hokazono et al. |
| 2002/0001710 A1 | 1/2002 | Kang et al. |
| 2002/0197481 A1 | 12/2002 | Jing et al. |
| 2003/0049343 A1 | 3/2003 | Foreman et al. |
| 2003/0077454 A1 | 4/2003 | Jing |
| 2003/0120008 A1 | 6/2003 | Obayashi et al. |
| 2004/0019176 A1 | 1/2004 | Araki et al. |
| 2004/0114248 A1 | 6/2004 | Hokazono et al. |
| 2004/0124396 A1 | 7/2004 | Flynn et al. |
| 2004/0196558 A1 | 10/2004 | Takahashi et al. |
| 2005/0038137 A1 | 2/2005 | Yoshihara et al. |
| 2005/0038187 A1 | 2/2005 | Mano et al. |
| 2005/0136252 A1 | 6/2005 | Chisholm et al. |
| 2005/0182199 A1 | 8/2005 | Jing et al. |
| 2005/0249942 A1 | 11/2005 | Coggio et al. |
| 2005/0250921 A1 | 11/2005 | Qiu et al. |
| 2006/0147723 A1 | 7/2006 | Jing et al. |

FOREIGN PATENT DOCUMENTS

| | | |
|---|---|---|
| EP | 0243605 | 11/1987 |
| EP | 0398241 | 11/1990 |
| EP | 0407937 | 1/1991 |
| EP | 0428133 | 5/1991 |
| EP | 0457903 | 11/1991 |
| EP | 0488627 | 6/1992 |
| EP | 0570254 | 11/1993 |
| EP | 0339880 | 12/1993 |
| EP | 0863128 | 9/1998 |
| EP | 0953584 | 11/1999 |
| EP | 1026200 | 8/2000 |
| EP | 1279443 | 1/2003 |
| EP | 1460091 | 9/2004 |
| JP | 2003-183322 | 7/2003 |
| JP | 2003-183592 | 7/2003 |
| WO | 93/21010 | 10/1993 |
| WO | 94/06837 | 3/1994 |
| WO | 00/12754 | 9/2000 |
| WO | 02/18457 | 3/2002 |
| WO | 03/054031 | 7/2003 |
| WO | 2005/103175 | 11/2005 |

OTHER PUBLICATIONS

Schmiegel, W., Crosslinking of Elastomeric Vinylidene Fluoride Copolymers with Nucleophiles, Angewendt Chemie, 1979 vol. 76/77 39-65.

S.C. Kim, L.H. Sperling; IPNS Around The World Science and Engineering. The Current Status of Interpenetrating Polymer Networks 1997 J. Wiley & Sons Ltd., pp. 1-5.

Scheirs, T., Modern Fluoropolymers, Ed. (1997), J. Wiley Science, Chps. 2 and 13(ISBN 0-471-97055-7).

LOW REFRACTIVE INDEX FLUOROPOLYMER COMPOSITIONS HAVING IMPROVED COATING AND DURABILITY PROPERTIES

CROSS REFERENCE TO RELATED APPLICATIONS

This application is a continuation of U.S. patent application Ser. No. 11/026,614 filed Dec. 30, 2004 now abandoned.

TECHNICAL FIELD AND INDUSTRIAL APPLICABILITY OF THE INVENTION

The present invention relates to antireflection films and more specifically to low refractive index fluoropolymer compositions for use in antireflection films.

BACKGROUND OF THE INVENTION

Antireflective polymer films ("AR films") are becoming increasingly important in the display industry. New applications are being developed for low reflective films applied to substrates of articles used in the computer, television, appliance, mobile phone, aerospace and automotive industries.

The physical principles by which anti-reflection films and coatings function are well known. Several overviews can be found, for example, in *Optical Engineering*, S. Muskiant Ed, Vol. 6., *Optical Materials*, Chap. 7, p 161, 1985 and as shown in U.S. Pat. No. 3,833,368 to Land, et al. AR films are preferably constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner which minimizes the amount of reflected light in this optical range. Desirable product features in AR films for use on optical goods are a low percentage of reflected light (e.g. 1.5% or lower) and durability to scratches and abrasions. These features are obtained in AR constructions by maximizing the delta RI between the polymer layers while maintaining or improving other critical material properties such as low coefficient of friction, high hardness and strong adhesion between the polymer layers. In addition to these types of performance features, it is necessary to process these materials by an economically favorable manufacturing process. Although inorganic materials, such as indium tin oxide ("ITO"), possess both high index and hardness, they are difficult and expensive to process into continuous films. Often times these materials require vacuum or chemical vapor deposition techniques. Moreover such metalized surfaces often reflect blue light and therefore optical substrates with such materials are slightly colored and therefore have compromised viewing cosmetics. In order to improve on these processing limitations of high index metal surfaces, new polymeric materials based on polycarbonate or polyesters can be used. However these materials do not have as high of refractive index as metalized surfaces and therefore there is a need for improved low refractive index materials with improved durability. Such materials can be used in conjunction with high index polymers to maximize the delta refractive index between the layers and minimize the amount of reflected light.

As described in Groh and Zimmerman, *Macromolecules*, Vol. 24 p. 6660 (1991), it is known that fluorine containing materials have an inherently low refractive index and are therefore useful in AR films. Fluoropolymers provide additional advantages over conventional hydrocarbon-based materials such as relatively high chemical inertness (in terms of acid and base resistance), dirt and stain resistance (due to low surface energy) low moisture absorption, and resistance to weather and solar conditions. However, fluoropolymers tend to have relatively low hardness and poor abrasion and wear resistance properties compared to hydrocarbon polymers such as polymethylmethacrylate ("PMMA").

The refractive index of fluorinated polymer coatings is generally dependent upon the volume percentage of fluorine contained within the coating layer. Increased fluorine content in the layers typically decreases the refractive index of the coating. Several examples of AR coatings using fluoropolymers and fluorine containing materials can be found in the invention of Fung and Ko (U.S. Pat. No. 5,846,650), Savu (U.S. Pat. No. 5,148,511), Choi et al (U.S. Pat. No. 6,379,788), and Suzuki (U.S. Pat. No. 6,343,865), which are herein incorporated by reference. Although it is desirable to increase the fluorine content of the low refractive index coating in order to decrease the refractive index, an increase in fluorine content of the low index coating composition tends to decrease the surface energy of the polymer, which in turn can result in poor coating and optical cosmetic properties. Furthermore, low surface energy polymers can reduce the interfacial adhesion between the low refractive index layer and a high refractive index layer. A loss in interfacial adhesion between these layers will compromise the AR film durability.

The use of interpenetrating or semi-interpenetrating polymer networks between fluoropolymers and acrylate monomers have been previously described, for example, in EP 570254 (Kumar et al.) and WO9406837 (Bogaert et al.), which is herein incorporated by reference, for use in stain resistant, flexible, high gloss ultraviolet radiation curable floor coatings. The fluoropolymer component of the floor coating provides excellent weatherability, high temperature performance and stain resistant properties, while the introduction of the acrylate monomers aid in adhering the polymer material to the vinyl substrates, therein improving the durability of the coating. Further, the acrylate monomers improve the hardness of the resultant coatings. While these coatings are ideally suited for floor coatings, they have never been investigated for use in antireflection film layers.

Thus, it is highly desirable to form a low refractive index layer for an antireflection film having increased fluorine content, and hence lower refractive index, while improving interfacial adhesion to accompanying high index layers or substrates. The resultant AR film thereby has improved abrasion resistance as compared with low refractive index coatings formed in accordance with the prior art described above.

SUMMARY OF THE INVENTION

The present invention provides a composition and method for forming a low refractive index layer for use in an antireflective film that addresses these issues. Further, the present invention provides an optical device having such a low refractive index layer as a portion of its antireflective film.

The low refractive index fluoropolymer compositions of the AR films described in this invention are derived from an interpenetrating polymer network or semi-interpenetrating polymer network which comprises a reactive fluoroplastic and/or a fluoroelastomer (i.e. the functional fluoropolymer phase) blended with multi-functional acrylates (i.e. the acrylate phase) such as trimethylolpropane triacrylate (TMPTA) and optionally additional fluorinated mono-functional acrylates or multi-functional fluorinated acrylates which can be coated and cured by ultraviolet light or by thermal means. The presence of an acrylate crosslinker provides a composition with both low refractive index and improved adhesion to high index polymer substrates such as polyethylene terephthalate ("PET") or hard coated PET films.

The coating mixture describe herein comprises a reactive high molecular weight fluoropolymers which can participate in the crosslinking reactions between the monomeric multifunctional acrylates. This enhances the crosslinkability of the fluoropolymer phase to the forming polyacrylate phase and produces a co-crosslinked, interpenetrating or semi-interpenetrating polymer network with enhanced interfacial contact between the high index layer and the low index layer and thereby improved durability and low refractive index.

Further, improvements in the mechanical strength and scratch resistance of the low refractive index compositions can be enhanced through the incorporation of surface functionalized nanoparticles into the fluoropolymer compositions. Providing functionality to the nanoparticles further enhances the interactions between the fluoropolymers and such functionalized particles.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

For the following defined terms, these definitions shall be applied, unless a different definition is given in the claims or elsewhere in the specification.

The term "polymer" will be understood to include polymers, copolymers (e.g. polymers using two or more different monomers), oligomers and combinations thereof, as well as polymers, oligomers, or copolymers that are useful to form the interpenetrating polymer network ("IPN") or semi-interpenetrating polymer network ("semi-IPN").

The term IPN refers to a broad class of polymer blends in which one polymer is mixed or polymerized in the presence of another polymer or monomer mixture. The polymers can form a variety of molecular phases consisting of co-crosslinked phases, thermoplastic (crystalline phases), mechanically cross-linked phases, e.g. by means of chain entanglement or co-crosslinked networks in which the two different polymer phases have chemical crosslinking between the polymer phases.

The term semi-IPN, refers specifically to a blended polymer network where only one component of the polymer mixture is covalently crosslinked to itself.

The term co-crosslinked IPN, or co-crosslinked semi-IPN, refers to the special case where both polymer networks can react in such a manner to form a co-crosslinked polymer blend. Specific descriptions can be found in such references as *IPNs Around the World-Science and Engineering*, by Kim and Sperling Eds, Wiley Science, 1997 Chapter 1.

The term "low refractive index", for the purposes of the present invention, shall generally mean a material, when applied as a layer to a substrate, forms a coating layer having a refractive index of less than about 1.5, and more preferably less than about 1.45, and most preferably less than about 1.42.

The term "high refractive index", for the purposes of the present invention, shall generally mean a material, when applied as a layer to a substrate, forms a coating layer having a refractive index of greater than about 1.6.

However, in broader terms, all that is required in the present invention is that the low refractive index layer is formed having a refractive index less than a high refractive index layer. Thus, coating layers wherein the low refractive index layer having a refractive index slightly greater than about 1.5, when coupled with a high refractive index layer having a refractive index slightly less than about 1.6, wherein the refractive index of the low refractive index layer is less than the refractive index of the high refractive index layer, are also specifically contemplated and encompassed by the present invention.

As used herein, the term ceramer is a composition having inorganic oxide particles, e.g. silica, of nanometer dimensions dispersed in a binder matrix. The phrase "ceramer composition" is meant to indicate a ceramer formulation in accordance with the present invention that has not been at least partially cured with radiation energy, and thus is a flowing, coatable liquid. The phrase "ceramer composite" or "coating layer" is meant to indicate a ceramer formulation in accordance with the present invention that has been at least partially cured with radiation energy, so that it is a substantially non-flowing solid. Additionally, the phrase "free-radically polymerizable" refers to the ability of monomers, oligomers, polymers or the like to participate in crosslinking reactions upon exposure to a suitable source of curing energy.

The recitation of numerical ranges by endpoints includes all numbers subsumed within the range (e.g. the range 1 to 10 includes 1, 1.5, 3.33, and 10).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly indicates otherwise.

Unless otherwise indicated, all numbers expressing quantities of ingredients, measurements of properties such as contact angle and so forth as used in the specification and claims are to be understood to be modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as accurately as possible. Any numerical value, however, inherently contains certain errors necessarily resulting from the standard deviations found in their respective testing measurements.

The present invention is directed to antireflection materials used as a portion of optical displays ("displays"). The displays include various illuminated and non-illuminated displays panels wherein a combination of low surface energy (e.g. anti-soiling, stain resistant, oil and/or water repellency) and durability (e.g. abrasion resistance) is desired while maintaining optical clarity. The antireflection material functions to decrease glare and decrease transmission loss while improving durability and optical clarity.

Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches. The light transmissive (i.e. exposed surface) substrate of such display panels may be referred to as a "lens." The invention is particularly useful for displays having a viewing surface that is susceptible to damage.

The coating composition, and reactive product thereof, as well as the protective articles of the invention, can be employed in a variety of portable and non-portable information display articles. These articles include, but are not limited by, PDAs, LCD-TV's (both edge-lit and direct-lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, instrument panel covers, signage such as graphic displays and the like. These devices can have planar viewing faces, or non-planar viewing faces such as slightly curved faces.

Figure 1:
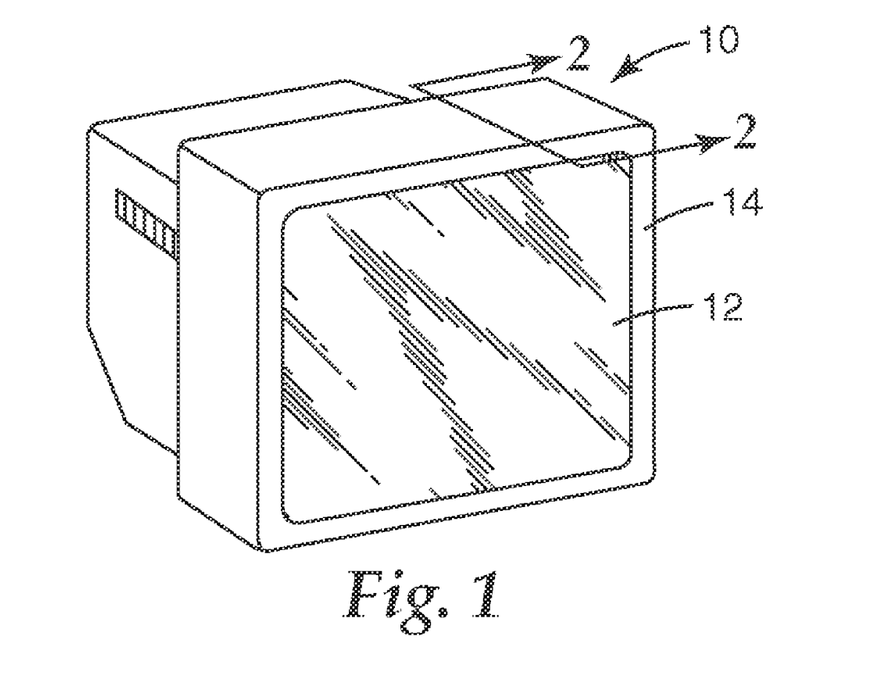
FIG. 1 is perspective view of an article having an optical display.

Referring now to FIG. 1, a perspective view of an article (here a computer monitor 10) is illustrated according to one preferred embodiment as having an optical display 12 coupled within a housing 14. The optical display 12 is a substantially transparent material having optically enhancing properties through which a user can view text, graphics or other displayed information.

Figure 2:
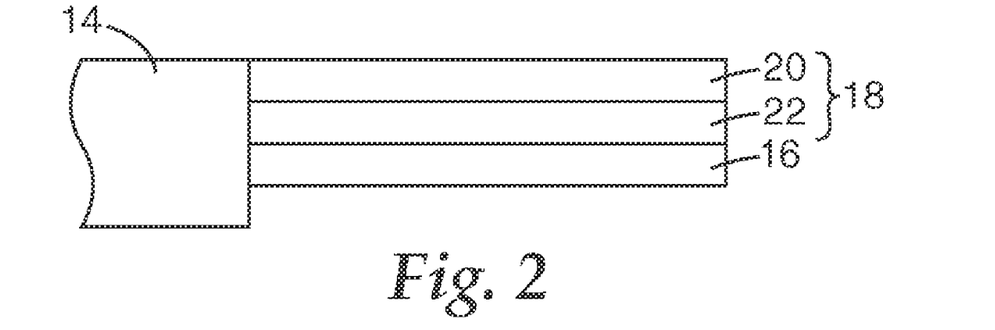
FIG. 2 is a sectional view of the article of FIG. 1 taken along line 2-2 illustrating an antireflection film having a low refractive index layer formed in accordance with a preferred embodiment of the present invention.

As best shown in FIG. 2, the optical display 12 includes an antireflection film 18 coupled (coated) to an optical substrate 16. The antireflection film 18 has at least one layer of a high refractive index layer 22 and a low refractive index layer 20 coupled together such that the low refractive index layer 22 being positioned to be exposed to the atmosphere while the high refractive index layer 22 is positioned between the substrate 16 and low refractive index layer 20.

While not shown, other layers may be incorporated into the optical device, including, but not limited to, other hard coating layers, adhesive layers, and the like. Further, the antireflection material 18 may be applied directly to the substrate 16, or alternatively applied to a release layer of a transferable antireflection film and subsequently transferred from the release layer to the substrate using a heat press or photoradiation application technique.

The high refractive index layer 22 is a conventional carbon-based polymeric composition having a mono and multifunctional acrylate crosslinking system. Zirconium dioxide ("ZrO$_2$") and titanium dioxide ("TiO$_2$") are desirable particles for use in high index refractive layers 22. The particle size of the high index inorganic particles is preferably less than about 50 nm in order that it is sufficiently transparent. The surface particles are modified with organic moieties designed to allow further crosslinking of the particle within the polymer network and allows adequate dispersion of the particles in the high refractive index polymer matrix.

Further, the low refractive index layer 20 may be coupled directly to the substrate 16, or hardcoated substrate, without the high refractive index layer 22.

The low refractive index coating composition of the present invention is applied as a wet layer to either to the high refractive index coating layer 22 or directly to the polymeric substrate 16 by standard techniques. The wet layer is then photoreacted to form a layer 20 having a fluoropolymer phase covalently crosslinked to an acrylate phase to form a co-crosslinked, interpenetrating or semi-interpenetrating polymer network. The crosslinking of the fluoropolymer phase with the acrylate phase enhances the durability of the low refractive index layer by increasing the interfacial adhesion of the layer to both the high refractive index layer and/or to a PET film.

Fluoropolymer materials used in the low index coating may be described by broadly categorizing them into one of two basic classes. A first class includes those amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers contemplated by this invention are, for example, VDF-chlorotrifluoroethylene copolymers. One such VDF-chlorotrifluoroethylene copolymer is commercially known as Kel-F™ 3700, available from 3M Company. As used herein, amorphous fluoropolymers are materials that contain essentially no crystallinity or possess no significant melting point as determined for example by differential scanning caloriometry (DSC). For the purpose of this discussion, a copolymer is defined as a polymeric material resulting from the simultaneous polymerization of two or more dissimilar monomers and a homopolymer is a polymeric material resulting from the polymerization of a single monomer.

The second significant class of fluoropolymers useful in this invention are those homo and copolymers based on fluorinated monomers such as TFE or VDF which do contain a crystalline melting point such as polyvinylidene fluoride (PVDF, available commercially from 3M company as Dyneon™ PVDF, or more preferable thermoplastic copolymers of TFE such as those based on the crystalline microstructure of TFE-HFP-VDF. Examples of such polymers are those available from 3M under the trade name Dyneon™ Fluoroplastics THV™ 200.

A general description and preparation of these classes of fluoropolymers can be found in Encyclopedia Chemical Technology, *Fluorocarbon Elastomers*, Kirk-Othmer (1993), or in *Modern Fluoropolymers*, J. Scheirs Ed, (1997), J Wiley Science, Chapters 2, 13, and 32. (ISBN 0-471-97055-7).

The preferred fluoropolymers are copolymers formed from the constituent monomers known as tetrafluoroethylene ("TFE"), hexafluoropropylene ("HFP"), and vinylidene fluoride ("VdF," "VF2,"). The monomer structures for these constituents are shown below as (1), (2) and (3):

$$\text{TFE: CF}_2\!=\!\text{CF}_2 \tag{1}$$

$$\text{VDF: CH}_2\!=\!\text{CF}_2 \tag{2}$$

$$\text{HFP: CF}_2\!=\!\text{CF}\!-\!\text{CF}_3 \tag{3}$$

The preferred fluoropolymer consists of at least two of the constituent monomers (HFP and VDF), and more preferably all three of the constituents monomers in varying molar amounts. Additional monomers not depicted above but also useful in the present invention include perfluorovinyl ether monomers of the general structure: CF$_2$=CF—OR$_f$, wherein R$_f$ can be a branched or linear perfluoroalkyl radical of 1-8 carbons and can itself contain additional heteroatoms such as oxygen. Specific examples are perfluoromethyl vinyl ether, perfluoropropyl vinyl ether, and perfluoro (3-methoxy-propyl) vinyl ether. Additional examples incorporated by reference herein are found in WO00/12754 to Worm, assigned to 3M, and U.S. Pat. No. 5,214,100 to Carlson.

For the purposes of the present invention, crystalline copolymers with all three constituent monomers shall be hereinafter referred to as THV, while amorphous copolymers consisting of VDF-HFP and optionally TFE is hereinafter referred to as FKM, or FKM elastomers as denoted in ASTM D 1418. THV and FKM elastomers have the general formula (4):

$$—(CF_2—CF_2)_x—(CF_2—CF)_y—(CH_2—CF_2)_z— \\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ | \\ \ \ \ \ \ \ \ \ \ \ \ \ \ \ \ \ \ \ \ \ \ \ \ \ \ \ \ \ \ \ \ \ \ \ \ \ \ \ \ \ \ \ \ \ \ CF_3$$ (4)

wherein x, y and z are expressed as molar percentages.

For fluorothermoplastics materials (crystalline) such as THV, x is greater than zero and the molar amount of y is typically less than about 15 molar percent. One commercially available form of THV contemplated for use in the present invention is Dyneon™ Fluorothermoplastic THV™ 220, a mixture that is manufactured by Dyneon LLC, of Saint Paul Minn. Other useful fluorothermoplastics meeting these criteria and commercially available, for example, from Dyneon LLC, Saint Paul Minn., are sold under the trade names THV™ 200, THV™ 500, and THV™ 800. THV™ 200 is most preferred since it is readily soluble in common organic solvents such as MEK and this facilitates coating and processing, however this is a choice born out of preferred coating behavior and not a limitation of the material used a low refractive index coating.

In addition, other fluoroplastic materials not specifically falling under the criteria of the previous paragraph are also contemplated by the present invention. For example, PVDF-containing fluoroplastic materials having very low molar levels of HFP are also contemplated by the present invention and are sold under the trade name Dyneon™ PVDF 6010 or 3100, available from Dyneon LLC, of St. Paul, Minn.; and Kynar™ 740, 2800, 9301, available from Elf Atochem North America Inc. Further, other fluoroplastic materials are specifically contemplated wherein x is zero and wherein y is between about 0 and 18 percent. Optionally the microstructure can also contain additional non-fluorinated monomers such as ethylene, propylene, and butylene. Examples of such microstructures having non-fluorinated monomers commercially available include Dyneon™ ETFE and THE fluoroplastics.

For fluoroelastomers compositions (amorphous) useful in the present invention, x can be zero so long as the molar percentage of y is sufficiently high (typically greater than about 18 molar percent) to render the microstructure amorphous. One example of a commercially available elastomeric compound of this type is available from Dyneon LLC, St. Paul Minn., under the trade name Dyneon™ Fluoroelastomer FC 2145.

Additional fluoroelastomeric compositions useful in the present invention exist where x is greater than zero. Such materials are often referred to as elastomeric TFE containing terpolymers. One example of a commercially available elastomeric compound of this type is available from Dyneon LLC, St. Paul, Minn., and is sold under the trade name Dyneon™ Fluoroelastomer FT 2430.

In addition, other fluorelastomeric compositions not classified under the preceding paragraphs are also useful in the present invention. For example, propylene-containing fluoroelastomers are a class useful in this invention. Examples of propylene-containing fluoroelastomers known as base resistant elastomers ("BRE") and are commercially available from Dyneon under the trade name Dyneon™ BRE 7200. available from 3M Company of St. Paul, Minn. Other examples of TFE-propylene copolymers can also be used and are commercially available under the tradename Aflaf™, available from Asahi Glass Company of Charlotte, N.C.

In one preferred approach, these polymer compositions further comprise reactive functionality such as halogen containing cure site monomers ("CSM") and/or halogenated endgroups, which are interpolymerized into the polymer microstructure using numerous techniques known in the art. These halogen groups provide reactivity towards the acrylate crosslinking units to tie all components together in the interpenetrating polymer network. Useful halogen containing monomers are well known in the art and typical examples are found in U.S. Pat. No. 4,214,060 to Apotheker et al., European Patent No. EP398241 to Moore, and European Patent No. EP407937B1 to Vincenzo et al. Optionally halogen cure sites can be introduced into the polymer microstructure via the judicious use of halogenated chain transfer agents which produce fluoropolymer chain ends that contain reactive halogen endgroups. Such chain transfer agents ("CTA") are well known in the literature and typical examples are Br—$CF_2CF_2$—Br, $CF_2Br_2$, $CF_2I_2$, $CH_2I_2$, typical examples are found in U.S. Pat. No. 4,000,356 to Weisgerber. Whether the halogen is incorporated into the polymer microstructure by means of a CSM or CTA agent or both is not particularly relevant as both result in a fluoropolymer which is more reactive towards UV crosslinking and coreaction with other components of the IPN such as the acrylates. An advantage to use of cure site monomers in forming the co-crosslinked network, as opposed to a dehydrofluorination approach, is that the optical clarity of the formed polymer layer is not compromised since the reaction of the acrylate and the fluoropolymer does not rely on unsaturation in the polymer backbone in order to react. Thus, a bromo-containing fluoroelastomer such as Dyneon™ E-15472 or E-18402 commercially available from Dyneon LLC of Saint Paul, Minn., may be used in conjunction with, or in place of, THV or FKM as the fluoropolymer.

Preferably, the fluoropolymer is dissolved in an organic solvent, such as THF, treated with hindered bases such as a triethyl amine or DBU (1-8 diazobicyclo [5.4.0]undec-7-ene) that introduces unsaturation into the polymer backbone via the dehydrofluorination ("DHF") of a vinylidene fluoride component of the fluoropolymer. Useful concentrations of DBU to effectively DHF the polymer for use in this invention are limited by the tendency of dehydrofluorinated polymers to undergo gelation (i.e. become insoluble upon drying) at high levels of unsaturation. Therefore, preferable ranges of DBU are in the range of 0.01-0.5 g DBU/g-polymer, and more preferably 0.02-0.1 g DBU/g-polymer, with the amount of DBU primarily dependent upon the VDF weight percent content of the fluoropolymer, in order to achieve a small amount of unsaturation. Thus for example, for THV 200, which has a VdF molar percentage of about 50%, a preferred amount of unsaturation is between about 0.5 and 26 mole percent, with a more preferred amount being between about 1 and 6 mole percent. For FT 2430, which has a VDF molar percentage of about 59%, a preferred amount of unsaturation is between about 0.6 and 29 mole percent, with a more preferred amount being between about 1.2 and 6 mole percent.

This small amount of unsaturation in the fluoropolymer enhances the reactivity between the fluoropolymer and the acrylate, therefore improving IPN formation. Further, less acrylate crosslinker is required to form a similarly crosslinked IPN, which results in a coating having an overall lower refractive index. Moreover the fluoropolymer can be dehydrofluorinated in the latex form in the method described in Coggio et al, U.S. Pat. No. 5,733,981, which is herein incorporated by reference. A general reaction scheme (5), for illustrative purposes, is shown below wherein a vinylidene fluoride component of the fluoropolymer (FP) is dehydrofluorinated in the presence of DBU as follows:

Preferably, the fluoropolymer is dissolved in an organic solvent, such as THF, treated with hindered bases such as a triethyl amine or DBU (1-8 diazobicyclo [5.4.0]undec-7-ene) that introduces unsaturation into the polymer backbone via the dehydrofluorination of a vinylidene fluoride component of the fluoropolymer. Useful concentrations of DBU to effectively DHF the polymer for use in this invention are in the range of 0.01-0.5 g DBU/g-polymer. More preferably 0.02-0.1 g DUB/g-polymer. Moreover the fluoropolymer can be dehydrofluorinated in the latex form in the method described in Coggio et al, U.S. Pat. No. 5,733,981, which is herein incorporated by reference. A general reaction scheme (5), for illustrative purposes, is shown below wherein a vinylidene fluoride component of the fluoropolymer (FP) is dehydrofluorinated in the presence of DBU as follows:

FP-CH2-CF2-FP+DBU→FP-CH=CF-FP+HF (5)

The preferred reaction site of dehydrofluorination is substantially between HFP-VDF-HFP triads, HFP-VDF diads or TFE-VDF-TFE triads. The precise location of the dehydroflourination is not critical, and essentially results in the same structural formation of unsaturation in the fluoropolymer backbone. This unsaturation is susceptible to a free radical or nucleophilic crosslinking reaction, which allows further bonding, and improved adhesion of the low index refractive layer 20 to the high refractive index layer 22. Dehydrofluorination as a means to improve crosslinking and adhesion between fluoropolymers and other substrates has been shown in other applications, such as in making fuel line barrier hoses for gas powered vehicles, as described in U.S. Pat. Nos. 6,080,487; 6,346,328; and 6,270,901; all assigned to 3M, or Dyneon LLC, of Saint Paul, Minn., and are herein incorporated by reference.

While the low refractive films formed in a dehydrofluorination reaction are slightly colored in thicker films, this phenomenon does not adversely affect optical quality in thinner films, such as the low refractive index films 16 of the present invention.

In a third alternative approach, a fluoropolymer could be formed having both halogen containing cure site monomers and a degree of unsaturation introduced via a dehydrofluorination reaction into the same fluoropolymer backbone or in a blend of the two fluoropolymer backbones (one with the halogen containing sites, one with the degree of unsaturation).

In a fourth alternative approach, the mechanical durability of the resultant low refractive index layers 16 can be further enhanced by the introduction of surface modified inorganic particles to the composition.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in precipitation of the inorganic oxide particles or gelation. The inorganic oxide particles are typically colloidal in size, having an average particle diameter of 5 nanometers to 100 nanometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. Most preferably, the particles are formed of silicon dioxide ($SiO_2$).

The surface particles are modified with organic moieties designed to enhance the polymer-particle interaction and co-reactivity between the fluoropolymer, acrylate and particles phases. Such functionalities include mercaptan, vinyl, bromo, iodo acrylate and others believed to enhance the interaction between the inorganic particles and low index fluoropolymers, especially those containing bromo or iodo cure site monomers. Other additional examples of surface agents contemplated by this invention include but are not limited to 3-methacryloxypropyltrimethoxy silane (A174, available from OSI Specialty Chemicals), and vinyl trialkoxysilanes such as trimethoxy and triethoxysilane and hexamethyldisilizane.

The surface modifications allow further crosslinking of the particle within the polymer network and allows adequate dispersion of the particles in the fluoropolymer matrix. The use of silica particles to enhance durability within AR film layers is described in U.S. Pat. No. 3,833,368 to Land et al. and U.S. Pat. No. 6,343,865 to Suzuki, however the use of such particles in co-crosslinked interpenetrating polymer networks is not contemplated.

For the purposes of simplicity, the fluoropolymer backbone formed under any of these four approaches is hereinafter referred to as the functional fluoropolymer phase.

As described above, the low refractive index composition also consists of an acrylate phase. The acrylate phase consists of one or more crosslinking agents that react (i.e. covalently bond) with the fluoropolymer phase to form a co-crosslinked interpenetrating polymer network, or fluoropolymer matrix.

Useful crosslinking agents for use in the acrylate phase include, for example, poly(meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth) acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

A preferred crosslinking agent comprises at least three (meth)acrylate functional groups. Preferred commercially available crosslinking agents include those available from Sartomer Company, Exton, Pa. such as trimethylolpropane triacrylate (TMPTA) available under the trade designation "SR351", pentaerythritol tri/tetraacrylate (PETA) available under the trade designation "SR 295, SR444" or "SR494" dipentaerythritol penta/hexa acrylate available as SR 399LV.

Another preferred class of acrylates useful in the present invention includes fluorinated acrylates exemplified by perfluoropolyether acrylates that are based on monofunctional acrylate and/or multifunctional acrylate derivatives of hexafluoropropylene oxide ("HFPO"). These species are described in U.S. patent application Ser. No. 10/841,159, filed May 7, 2004 and are herein incorporated by reference. The HFPO acrylates are useful as either a component to render the film surface soil resistant and easy to clean. Moreover the multifunctional HFPO acrylates provide the additional benefit of crosslinking and further enhance the durability of the film.

As used in the examples, "HFPO-" refers to the end group $C_3F_7O—(CF(CF_3)CF_2O)_aCF(CF_3)C(O)—$ wherein "a" averages about 6.3, with an average molecular weight of 1,211 g/mol, and which can be prepared according to the method reported in U.S. Pat. No. 3,250,808 (Moore, et al.), the disclosure of which is incorporated herein by reference, with purification by fractional distillation.

Other fluorochemical acrylates can be used to enhance the IPN formation between the hydrocarbon acrylate phase and the low index fluoropolymer phase. Such examples are perfluorocyclohexyl acrylate as described in U.S. Pat. No. 5,148,511 to Savu et al., or 2,2,3,3,4,4,5,5, octafluoro dihydropentyl acrylate or methacrylate, each available from Oakwood Products of West Columbia, S.C.

Furthermore, it is possible, by the use of halogen or mercapto containing initiators or chain transfer agents, to incorporate functional endgroups such as chlorine, bromine, iodine, or —SH into the methacrylate polymer composition. These functional endgroups react with the fluoropolymer matrix under ultraviolet light to form further co-crosslinking between the fluoropolymer phase and the acrylate phase.

To form the low refractive index composition, the fluoropolymer under any of the three approaches above is first dissolved in a compatible organic solvent. The compatible organic solvent that is preferably utilized is methyl ethyl ketone ("MEK"). However, other organic solvents may also be utilized, as well as mixtures of compatible organic solvents, and still fall within the spirit of the present invention. For example, other organic solvents contemplated include acetone, cyclohexanone, methyl isobutyl ketone ("MIBK"), methyl amyl ketone ("MAK"), tetrahydrofuran ("THF"), methyl acetate, isopropyl alcohol ("IPA"), or mixtures thereof, may also be utilized.

Next, the acrylate phase is introduced to the dissolved fluoropolymer. The entire mixture is diluted further to about 1-10% solids, and more preferably between about 2 and 5% solids, with additional organic solvent or other solvents, depending upon the blend of solvents and desired application technique and conditions.

To facilitate curing, the polymerizable compositions according of the present invention may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. Nos. 4,654,233 (Grant, et al.); 4,855,184 (Klun, et al.); and 6,224,949 (Wright, et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, benzyldimethyl ketal (available as "KB-1" from Sartomer), alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used.

Further, sensitizers such as 2-isopropyl thioxanthone, commercially available from First Chemical Corporation, Pascagoula, Miss., may be used in conjunction with photoinitiator(s) such as ""IRGACURE 369".

In addition, other additives may be added to the final composition. These include but are not limited to resinous flow aids, photostabilizers, high boiling point solvents, and other compatibilizers well known to those of skill in the art.

The diluted low refractive index solution comprising the fluoropolymer and acrylate phases is then applied to the high refractive index layer 18 or directly to the substrate (or hard-coated substrate) using conventional film application techniques.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be formed to a succession of discrete sheets.

The wet film is dried in an oven to remove the solvent and then subjected to ultraviolet radiation using an H-bulb or other lamp at a desired wavelength, preferably in an inert atmosphere (less than 50 parts per million oxygen). The reaction mechanism causes the multifunctional component of the acrylate phase to covalently crosslink with the fluoropolymer phase. Further, the crosslinking causes the fluoropolymer phase and acrylate phase to substantially entangle, therein forming an interpenetrating polymer network, or IPN. The resultant film thus constitutes a co-crosslinked interpenetrating polymer network having a desired thickness in the range of about 75-130 nanometers. As one of ordinary skill recognizes, this film thickness may vary depending upon the desired light reflectance/absorbency characteristics in conjunction with the desired durability characteristics.

The present invention thus provides many advantages over the prior art. The improvements to this composition are that the polymer composition is a blend of hydrocarbon with a fluoropolymer and therefore a reduction in the refractive index is anticipated. Moreover, the introduction of unsaturation or cure site monomers to the fluoropolymer backbone which can further react under ultraviolet radiation allow for further co-crosslinking and improved compatibility over a simple physical mixture. Further, the incorporation of surface modified inorganic particles can covalently bond to the fluoropolymer and acrylate backbone, and therefore provide a tougher and more homogeneous polymer/particle network.

EXAMPLES

General Procedure: In a general procedure, the desired fluoropolymer mixture was dissolved in MEK or acetone at 10% solids and added to a MEK solution containing additional low index fluorinated materials such as perfluorocyclohexyl dihydroacrylate (PFCHA) and various other monomers, crosslinkers and particles as listed in Tables 4A and 4B below. The entire low index coating solution was diluted further to about 5% solids in the solvent system noted in Tables 4A and 4B. Typically methyl isobutyl ketone (MIBK) was used. The amount of MIBK added was typically less than 50% wt of the solvent mixture, but its exact quantity could vary depending upon other conditions such as % relative humidity. The amount could be adjusted to obtain the desired coating quality. In addition, all low refractive index samples contained 2.0% by weight, based on solids, of Duracure 1173 as a photoinitiator unless noted otherwise. The low index solution were then coated on a hardcoated PET film and cured by UV irradiation in a nitrogen inerted chamber. The atmosphere of the cure chamber was monitored to maintain at least <50 ppm $O_2$.

Of course, as people of ordinary skill recognize, the following examples are but a few of the potentially limitless variations that can achieve the desired coating levels and characteristics.

Description of the Hardcoat (S1): Typically, the hardcoat is formed by coating a curable liquid ceramer composition onto a substrate, in this case primed PET, and curing the composition in situ to form a hardened film. Suitable coating methods include those previously described for application of the fluorochemical surface layer. Further, details concerning hardcoats can be found in U.S. Pat. Nos. 6,132,861 (Kang et al. '861), 6,238,798 (Kang et al. '798), 6,245,833 (Kang et al. '833) and 6,299,799 (Craig et al. '799).

One preferred substrate material is polyethylene terephthalate (PET) film obtained from e.i. DuPont de Nemours and Company, Wilmington, Del. under the trade designation "Melinex 618", and having a thickness of 5.0 mils and a primed surface. A hardcoat composition that was substantially the same as Example 3 of U.S. Pat. No. 6,299,799 was coated onto the primed surface and cured in a UV chamber having less than 50 parts per million (ppm) oxygen. The UV chamber was equipped with a 600 watt H-type bulb from Fusion UV systems of Gaithersburg Md., operating at full power. The hard coat was applied to the PET film with a metered, precision die coating process. The hard coat was diluted in IPA to 30 weight percent solids and coated onto the 5-mil PET backing to achieve a dry thickness of 5 microns. A flow meter was used to monitor and set the flow rate of the material from a pressurized container. The flow rate was adjusted by changing the air pressure inside the sealed container which forces liquid out through a tube, through a filter, the flow meter and then through the die. The dried and cured film was wound on a take up roll and used as the input backing for the coating solutions described below.

The S1 coating and drying parameters are shown below in Table 1:

TABLE 1

| | |
|---|---|
| Coating Width: | 6" (15 cm) |
| Web Speed: | 30 feet (9.1 m) per minute |
| Solution % Solids: | 30.2% |
| Filter: | 2.5 micron absolute |
| Pressure Pot: | 1.5 gallon capacity (5.7 l) |
| Flow Rate: | 35 cc/min |
| Wet Coating Thickness: | 24.9 microns |
| Dry Coating Thickness: | 4.9 microns |
| Conventional Oven Temps: | 140° F. (60° C.) Zone 1 |
| | 160° F. (53° C.) Zone 2 |
| | 180° F. (82° C.) Zone 3 |
| Length of Oven: | 10 feet (3 m) |

Description of the coating process used for the compositions of the invention: The low index coating solutions were coated onto the PET hardcoat layer (S1) using a precision, metered die coater. For this step, a syringe pump was used to meter the solution into the die. The solutions were diluted to a concentration of 3% to 5% solids as indicated in Tables 4A and 4B and coated onto the PET hardcoat (S1) layer to achieve a dry thickness of 100 nm. The material was dried in a conventional air flotation oven and then sent through the UV chamber having less than 50 ppm oxygen. The UV chamber was equipped with a 600 watt H-type bulb from Fusion UV systems, Gaithersburg Md., operating at full power.

The coating and drying parameters for the low index coating solutions are shown as follows in Table 2:

TABLE 2

| | |
|---|---|
| Coating Width: | 4" (10 cm) |
| Web Speed: | 10 feet per minute |
| Solution % Solids: | 5.0% |
| Pump: | 60 cc Syringe Pump |
| Approximate Flow Rate: | 1.2 cc/min |
| Wet Coating Thickness: | 4.1 microns |
| Dry Coating Thickness: | 100 nm |
| Conventional Oven Temps: | 120° C. Zone 1 |
| | 120° C. Zone 2 |
| Length of Oven: | 10 feet (3 m) |

Test Procedures

Cheese Cloth Durability Testing: The abrasion resistance of the cured films of the present invention was tested cross-web (perpendicular) to the coating direction by a mechanical device capable of oscillating cheesecloth fastened to a stylus by means of a rubber gasket across the film's surface. The stylus oscillated over a 10 cm wide sweep width at a rate of 3.5 wipes/second wherein a "wipe" is defined as a single travel of 10 cm. The stylus had a flat, cylindrical geometer with a diameter of 1.25 inch (3.2 cm). The device was equipped with a platform on which weights were placed to increase the force exerted by the stylus normal to the film's surface. The cheesecloth was obtained from Summers Optical, EMS Packaging, A subdivision of EMS Acquisition Corp., Hatsfield, Pa. under the trade designation "Mil Spec CCC-c-440 Product # S12905". The cheesecloth was folded into 12 layers. The data are reported as the number of wipes and weight in grams needed to visibly scratch the film's surface. The data are reported in Tables 4A and 4B below.

Linear Scratch testing: Scratch resistance of the coated films was accomplished by means of mechanical apparatus which can accelerate a diamond-graphite stylus across the surface of the film. The stylus has a diameter of 750 um and a 160° cone angle at the tip. The Linear Scratch Apparatus Model 4138, is available from Anorad Products, Hauppauge, N.Y. The diamond tipped styli are available from Graff Diamond Products Limited, Brampton, Ontario, Canada. The styli are accelerated across the surface of the film at 20 ft/min (6.7 m/min) for 4 inches (10.2 cm). The holder is equipped with a known weight applied normal to the surface of the film. The film is tested until failure or until the maximum weight for the apparatus of 750 g was reached. If a scratch was noted on the surface it was further evaluated by means of optical microscope (Axiotron™ Microscope with Axio-Imager™, available from Zeiss of Goetting, Germany) with a video interface (available from Optronics-Terra Universal of Anaheim, Calif.). The optical power was set at 10× and the nature of the damage was noted as: 1) no scratch ("NS"); 2) slight scratch ("SS"); 3) partial delamination ("PD"); and 4) full delamination ("FD"). Thus, for example, a sample that tests "FD-50 g" achieved full delamination using a 50-gram weight.

Sand Test: In this abrasion test, a circular piece of film is subjected to sand abrasion by means of an oscillating laboratory shaker, (Model DS 500E Orbital shaker available from VWR of W. Chester, Pa.). The percent change in reflection ("Δ % R") is used to determine the overall loss of the AR coating. Therefore, values reported with lower Δ % R exhibited improved sand abrasion resistance. The procedure for performing the sand test is achieved by first die cutting a coated film to a diameter of 90 mm. The middle of the film is marked on the uncoated side of the film with a 25 mm diameter circle to identify the "optical zone" where the before and after % R measurements will be made. The % R in this "optical zone" is measured at 550 nm by means of a Perkin-Elmer Lamda 900 UV-Vis-NIR spectrometer in the reflection mode. The film was placed coated side up in the lid of a 16 oz glass jar. (The jars are straight-sided, clear glass jars model WS-216922 available from Valu-Bulk™ Wheaton Glass Bottles Millville, N.J.). The sand was Ottawa Sand Standard, 20-30 mesh, and conforms to ASTM Standard C-190 T-132 and was obtained from VWR of W. Chester, Pa. The jar is placed in the shaker upside-down and secured into the oscillating shaker so the sand is in contact with the coated side of the film. The test assembly is oscillated for 15 min 25 sec at 250 rpm's. (Note, the 25 seconds allows the shaker to ramp up to the full 250 rpm's). After this test time, the film is removed from the lid. The coated surface is wiped with a soft cloth dampened with 2-propanol and the percent reflection is measured at 550 nm in the same optical zone as before. The change in reflection (Δ % R) is determined by the following relationship (6):

$$\Delta\% R = (R_f - R_i)/(R_h - R_i) \times 100 \tag{6}$$

wherein $R_f$ is the measured reflection after abrasion, $R_i$ is the initial reflection and $R_h$ is the reflection of the untreated hardcoat on PET.

The reported values of the average of 3-different films are summarized in Tables 4A and 4B for each example.

The ingredients used for forming the various low index layers to be evaluated in Tables 4A and 4B are summarized in the following paragraphs.

Ingredients:

Dyneon™ THV™ 220 Fluoroplastic (20 MFI, ASTM D 1238) is available as either a 30% solids latex grade under the trade name of Dyneon™ THV™ 220D Fluoroplastic dispersion, or as a pellet grade under the trade name of Dyneon™ THV™ 220G. Both are available from Dyneon LLC of St. Paul, Minn. In the case of Dyneon™ THV™ 220D, a coagulation step is necessary to isolate the polymer as a solid resin. The process for this is described below.

Coagulation of Dyneon™ THV™ 220D latex: The solid THV 220 resin derived from THV 220D latex can be obtained by freeze coagulation. In a typical procedure, 1-L of latex was placed in a plastic container and allowed to freeze at −18° C. for 16 hrs. The solids were allowed to thaw and the coagulated polymer was separated from the water phase by simple filtration. The solid polymer was than further divided into smaller pieces and washed 3-times with about 2 liters of hot water while being agitated. The polymer was collected and dried at 70-80° C. for 16 hours.

Dyneon™ FT 2430 Fluoroelastomer is a 70% wt F elastomer terpolymer available from Dyneon LLC of St. Paul, Minn. and was used as received.

Trimethylolpropane triacrylate SR 351 ("TMPTA") and Di-Pentaerythritol tri acrylate (SR 399LV) were obtained from Sartomer Company of Exton, Pa. and used as received.

Acryloyl chloride was obtained from Sigma-Aldrich and used without further purification.

"Darocur 1173" 2-hydroxy 2-methyl 1-phenyl propanone UV photoinitiator was obtained from Ciba Specialty Products, Terrytown, N.Y. and used as received.

"KB-1" benzyl dimethyl ketal UV photoinitiator was obtained from Sartomer Company, Exton, Pa. and was used as received.

2,2,3,3,4,4,5,5, Octafluoropentyl acrylate (8F-A), were obtained from Oakwood Products Inc. West Columbia, S.C. and used with out further purification.

1,1 dihydro, 2-perfluorocyclo acrylate PFCHA, (1,1, dihydroperfluorocyclohexyl carbinol acrylate) was prepared according to the method of Sauv US5148511 Preparation Example #1.

Oligomeric hexafluoropropylene oxide methyl ester (HFPO—C(O)OCH$_3$), can be prepared according to the method reported in U.S. Pat. No. 3,250,808 (Moore et al.). The broad product distribution of oligomers obtained from this preparation can be fractionated according to the method described in U.S. patent application Ser. No. 10/331,816, filed Dec. 30, 2002. This step yields the higher molecular weight distribution of oligomers used in this description wherein the number average degree of polymerization is about 6.3, and with an average molecular weight of 1,211 g/mol.

Preparation of Dehydrofluorinated Fluoropolymer: THV 220 or FT 2430 Fluoropolymer can be dehydrofluorinated by essentially the same method. A 3-neck round bottom reaction flask was equipped with a condenser, a N$_2$ inlet adaptor and a mechanical stirrer. THV™ 220G (or materials obtained by freeze coagulation of THV™ 220D, see above), 50 g of the polymer was charged to the flask and dissolved in 400 ml of dry tetrahydrofuran (THF, OminSolv-HPLC grade). After the polymer was completely dissolved, 1,8 diazo bicycle [5.4.0] undec-7-ene (1.0 g, DBU available from Aldrich Chemicals) was added to the polymer solution. Upon addition of the DBU the reaction mixture immediately turned light orange in color. The reaction was allowed to proceed at room temperature for about 16 hours. The polymer solution was purified by the slow addition of it into 600 ml of stirred deionized water made acidic by the addition of about 20 ml of 15 weight percent HCl. The light orange polymer could be easily collected from the coagulation flask, rinsed with ethanol (about 50 ml), pressed, semi-dried and redissolved in THF. The polymer solution was again precipitated as described above, collected, rinsed with ethanol (about 50 ml.) and pressed semi-dry, and then redissolved in THF and precipitated as above and further dried in an air oven at about 75-90° C. for 16 hours. The polymers are herein named D-THV or D-FKM, to denote the polymers have been dehydrofluorinated.

1. Preparation of HFPOC(O)—NH—CH$_2$CH$_2$—OH Starting Material (i.e. HFPO-AE-OH)

HFPO—C(O)OCH$_3$ (Mw=1211 g/mole, 50.0 g) was placed in 200 ml round bottom flask. The flask was purged with nitrogen and placed in a water bath to maintain a temperature of 50° C. or less. To this flask was added 3.0 g (0.045 mol) of 2-aminoethanol (obtained from Aldrich). The reaction mixture was stirred for about 1 hr, after which time an infrared spectrum of the reaction mixture showed complete loss of the methyl ester band at 1790 cm$^{-1}$ and the presence of the strong amide carbonyl stretch at 1710 cm$^{-1}$. Methyl t-butyl ether (MTBE, 200 ml) was added to the reaction mixture and the organic phase was extracted twice with water/HCl (about 5%) to remove unreacted amine and methanol. The MTBE layer was dried with MgSO$_4$. The MTBE was removed under reduced pressure to yield a clear, viscous liquid. Proton Nuclear magnetic resonance spectroscopy (NMR) and infrared spectroscopy (IR) confirmed the formation of the above-identified compound.

Preparation of Monofunctional Perfluoropolyether Acrylate,
HFPO—C(O)N(H)CH2CH2OC(O)CH=CH2
(HFPO-1)

HFPO-AE-OH (600 g) was combined with ethyl acetate (600 g) and triethylamine (57.9 g) in a 3-neck round bottom flask that was fitted with a mechanical stirrer, a reflux condenser, addition funnel, and a hose adapter that was connected to a source of nitrogen gas. The mixture was stirred under a nitrogen atmosphere and was heated to 40° C. Acryloyl chloride (51.75 g) was added dropwise to the flask from the addition funnel over about 30 minutes. The mixture was stirred at 40° C. overnight. The mixture was then allowed to cool to room temperature, diluted with 300 mL of 2N aqueous HCl and transferred to a separatory funnel. The aqueous layer was removed and the ethyl acetate layer was extracted with another 300 ml portion of 2N HCl. The organic phase was then extracted once with 5 weight percent aqueous NaHCO$_3$ separated, dried over MgSO$_4$ and filtered. Removal of the volatile components using a rotary evaporator resulted in 596 g of product (93% yield). Proton NMR and IR spectroscopy confirmed the formation of the above-identified compound.

Preparation of Modified Silica Nanoparticles

The silica nanoparticles were surface modified with 34-wt % methacryloxyl propyl trimethoxysilane and 66 wt % of 3-(N-Methylperfluoro-butanesulfonamido) propyltrimethoxysilane using the method described below.

A one-liter flask equipped with a dropping funnel, temperature controller, paddle stirrer, and distilling head was charged with 250 g of Nalco 2327 (20 nm ammonium stabilized colloidal silica sol, 41% solids; Nalco, Naperville, Ill.). Dowanol PM (methoxyisopropanol, 250 g) was added and the mixture was stirred at 300 rpm and heated to 75 degrees Celsius. 3-methacryloxypropyltrimethoxysilane (7.45 g, A174 OSI Specialties Chemical) was added. After 3 hours, the mixture was heated to 97 degrees Celsius and the distillation begun. At one hour, 100 g of distillate was collected and 90 g of Dowanol PM was added. This procedure was repeated three times over the next three hours, removing 250 g of additional distillate and adding an additional 270 g of Dowanol PM. The pot, now 113° C., was cooled to 75° C. and 9.5 g 3-(N-methylperfluorobutanesulfonamido) propyltrimethoxysilane was added in about 10 ml Dowanol PM. This was stirred 2 hr and left to cool overnight. The mixture was reheated to 75° C., treated with 2.2 g of additional 3-methacryloxypropyltrimethoxysilane, and after 2 hours, reheated to 113 degrees Celsius, collecting 58 g of product. The product on cooling was an opalescent viscous liquid, 471.6 g (theoretical % solids 24.4; experimentally found percent solids 24.2%. This particle dispersion in Dowanol was used to charge the particles to the coating solutions as described in Examples 15 and 16 of Tables 4A and 4B. For this reason, a small portion of the coating solvent mixture in these examples acknowledges the present of Dowanol PM.

IPN Network Formation:

Experiments were conducted to validate the co-crosslinking of the IPN network by UV curing. Coating solutions as described in Table 3, were solvent cast into a PTFE mold (dimension 75×25×3 mm) and allowed to air dry until a tacky film had formed. The mold was than placed in a UV curing chamber (Fusion UV Bench-top System Model L8880 Gaithersburg, Md.). The films were cured by exposure to UV light from (3-passes at 10 ft/min, 500 watt, mercury H-bulb). The films were removed from the mold and approximately 0.25 g of the films were placed in vials containing 5 ml. of MEK. Their solution behavior of each of the films was noted as follows: a) Soluble, no detectable gel was noted, which indicates no co-crosslinking; b) Slight Gel indicated the polymer swelled significantly but did not completely dissolved over 24 hrs., which indicates some or minimal co-crosslinking; or c) Gelled, which means the polymer essentially did not dissolve or swell significantly in the solvent after 72 hrs at room temperature, an indication of extensive co-crosslinking.

homopolymerization of the TMPTA, and not to co-crosslinking. Further, the addition of the multifunctional acrylate in samples 4 and 6 showed significantly more photocrosslinking do to the formation of the co-crosslinked IPN, as witness by the gelation observed within the respective vials.

Next, in Tables 4A and 4B, preparations of coating solutions of the various preferred embodiments of the present invention were formed and evaluated for cheesecloth resistance, linear scratch resistance, and optical transmission retention after sand testing ("sand test"). The samples (Ex. 1-16) were evaluated versus control samples (C1-4) without crosslinkers and with two control samples (C5 and C6) having increased amounts of TMPTA crosslinker and THV as the fluoropolymer. In the case of C5 and C6, it should be noted that the improvement in durability is at the expense of refractive index, as these samples cannot be used in a low refractive index coating.

TABLE 4A

| Solution # | D-THV | D-THV | D-FKM | Br-FKM | PFCHA | 8F-A | HFPO-AEA | TMPTA | DiPETA | Si-Particle | Solvent | % solids |
|---|---|---|---|---|---|---|---|---|---|---|---|---|
| C1 | 100 | | | | | | | | | | MEK | 5 |
| C2 | | 100 | | | | | | | | | MEK | 5 |
| C3 | | | 100 | | | | | | | | MEK | 5 |
| C4 | | | | 100 | | | | | | | MEK | 5 |
| C5 | 75 | | | | | | | 25 | | | MEK | 5 |
| C6 | 50 | | | | | | | 50 | | | MEK | 5 |
| EX1 | | 83.5 | | | | | 1 | 15 | | | MBK | 2.5 |
| EX2 | | 88 | | | | | | 10 | | | MEK/MBK | 2.5 |
| EX3 | | 78 | | | | | | 20 | | | MEK/MBK | 2.5 |
| EX4 | | 68 | | | | | | 30 | | | MEK/MBK | 2.5 |
| EX5 | | | 88 | | | | | 10 | | | MEK/MBK | 2.5 |
| EX6 | | | 78 | | | | | 20 | | | MEK/MBK | 2.5 |
| EX7 | | | 68 | | | | | 30 | | | MEK/MBK | 2.5 |
| EX8 | | | | 88 | | | | 10 | | | MEK/MBK | 2.5 |
| EX9 | | | | 78 | | | | 20 | | | MEK/MBK | 2.5 |
| EX10 | | | | 68 | | | | 30 | | | MEK/MBK | 2.5 |
| EX11 | | 90 | | | | | | | 10 | | MEK | 5 |
| EX12 | | 80 | | | | | | | 20 | | MEK | 5 |
| EX13 | | 70 | | | | | | | 30 | | MEK | 5 |
| EX14 | | | | | 60 | 20 | 5 | 15 | | | MEK | |
| EX15 | | 64 | | | | | | 27 | | 9 | MEK Dowanol-PM | 5 |
| EX16 | | 56 | | | | | | 24 | | 20 | MEK Dowanol-PM | 5 |

TABLE 3

| Sample # | Description | % Fluoropolymer | % Crosslinker | % Photoinitiator | Results |
|---|---|---|---|---|---|
| 1 | FKM FT2430-control | 100% | 0% | 7% | a-soluble |
| 2 | FKM/w/ TMPTA | 80% | 20% | 6% | b-slight gel |
| 3 | D-FKM-control | 100% | 0% | 7% | b-slight gel |
| 4 | D-FKM-TMPTA | 80% | 20% | 6% | c-gel |
| 5 | Br-FKM | 100% | 0% | 7% | b-slight gel |
| 6 | Br-FKM-TMPTA | 80% | 20% | 6% | c-gel |

These observations suggest that sample 1 did not undergo significant photocrosslinking, while samples 3 and 5 did undergo ultraviolet radiation induced photocrosslinking. Also, the slight gelation of sample 2 is attributed to the

TABLE 4B

| Solution # | Lab # | Cheese Cloth | Linear Scratch | Sand Test |
|---|---|---|---|---|
| C1 | 827034 | <25 wipes 300 g | FD-50 g | 100% |
| C2 | 1260404 | <25 wipes 300 g | FD-50 g | 90% |
| C3 | 1260420 | <25 wipes 300 g | FD-50 g | 100% |
| C4 | 1001033 | <25 wipes 300 g | FD-50 g | 100% |
| C5 | | | SS/PD 250 g | 70% |
| C6 | | | SS-250 g SS/PD 350 g | 29% |
| EX1 | 10130308 | 50/100-300 g; 25/50-725 g | ND | ND |
| EX2 | 1260408 | <25 wipes 300 g | SS/PD 200 g | 90% |
| EX3 | 1260412 | 50/100-300 g | SS/PD 200 g | 93% |
| EX4 | 1260416 | 25/50-300 g | SS- 200 g | 87% |

TABLE 4B-continued

| Solution # | Lab # | Cheese Cloth | Linear Scratch | Sand Test |
|---|---|---|---|---|
| EX5 | 1260424 | <25 wipes 300 g | FD-100 g | 100% |
| EX6 | 1260428 | <25 wipes 300 g | PD-100 g/FD-350 g | 70% |
| EX7 | 1260432 | 100/150-300 g | NS-250 g/ss-350 g | 100% |
| EX8 | 1260440 | <25 wipes 300 g | FD-100 g | ND |
| EX9 | 1260444 | <25 wipes 300 g | PD-100 g/FD-250 g | ND |
| EX10 | 1260448 | 25/50-300 g | PD/SS-250 g | ND |
| EX11 | 032604-07 | 100 wipes - scratch 300 g; 25 wipes - slight scratch 725 g; 25 wipes - heavy scratch 2 kg | SS-50 g | 0% |
| EX12 | 032604-11 | 100 wipes - scratch 300 g; 250 wipes - slight scratch 725 g; 100 wipes - wipe off 2 kg | SS-50 g | 10% |
| EX13 | 032604-15 | 1000 wipes - no scratch 300 g; 1000 wipes - no scratch 725 g; 1000 wipes - partial wipe off 2 kg | SS-100 g | 30% |
| EX14 | 032604-27 | 25/50 wipes - scratch 300 g; 25 wipes - scratch 725 g; 25 wipes - wipe off 2 kg | FD 50/100 g | 100% |
| EX15 | 041504-06 | 100/150 wipes - slight scratch 300 g; 50/100 wipes - slight scratch 725 g; <25 wipes - wipe off 2 kg | PD 50/100 g | 20% |
| EX16 | 041504-10 | 25/50 wipes - scratch 300 g; 50 wipes - slight scratch 725 g; <25 wipes - wipe off 2 kg | SS-50 g/PD-100 g | 14% |

As Tables 4A and 4B confirm, the addition of a degree of unsaturation, or the introduction of a cure site monomer to the fluoropolymer, in conjunction with a multifunctional acrylate crosslinker (TMPTA or DiPETA), showed improved durability as compared with the control samples. While not shown in Tables 4A and 4B, the experimental samples also achieved such durability at refractive indexes within the low range.

While the invention has been described in terms of preferred embodiments, it will be understood, of course, that the invention is not limited thereto since modifications may be made by those skilled in the art, particularly in light of the foregoing teachings.

What is claimed is:

1. An antireflection film comprising:
   a high refractive index layer; and
   a low refractive index layer comprising the reaction product of a functional fluoropolymer phase reacted with a multifunctional acrylate phase to form a co-crosslinked interpenetrating polymer network, wherein the functional fluoropolymer consists essentially of at least two constituent monomers selected from of TFE, VDF, and HFP; and the functional fluoropolymer has reactive functionality from at least one halogen containing cure site monomer, 0.5 to 6 mole percent of unsaturations in the fluoropolymer backbone, or a combination thereof.

2. The antireflective film of claim 1 wherein the functional fluoropolymer has reactive functionality from 0.5 to 6 mole percent of unsaturations in the fluoropolymer backbone.

3. The antireflection film of claim 1, wherein the functional fluoropolymer has reactive functionality from and at least one halogen containing cure site monomer.

4. The antireflection film of claim 1, wherein the functional fluoropolymer has reactive functionality from 0.5 to 6 mole percent of unsaturations in the fluoropolymer backbone and and at least one halogen containing cure site monomer.

5. The antireflection film of claim 1, wherein said functional fluoropolymer comprises an amorphous fluoropolymer.

6. The antireflection film of claim 5, wherein the functional fluoropolymer consists of interpolymerized units derived from at least HFP and VDF.

7. The antireflection film of claim 5, wherein said functional fluoropolymer phase further comprises a crystalline fluoropolymer composition.

8. The antireflection film of claim 1, wherein said multiacrylate phase comprises 10 wt-% to 50 wt-% of multifunctional acrylate crosslinker.

9. The antireflection film of claim 1, wherein the multifunctional acrylate crosslinker comprises at least three (meth)acrylate functional groups.

10. The antireflection film of claim 1, wherein said low refractive index composition further comprises a plurality of surface modified inorganic nanoparticles.

11. The antireflection film of claim 10, wherein said plurality of surface modified inorganic nanoparticles comprises a plurality of surface modified silica particles.

12. The antireflection film of claim 1, wherein said multiacrylate phase comprises a fluorinated acrylate composition.

13. The antireflection film of claim 12, wherein said fluorinated acrylate is a perfluoropolyether acrylate composition.

14. The antireflection film of claim 13, wherein said perfluoropolyether acrylate composition is selected from the group consisting of a HFPO-monoacrylate composition and a HFPO-multi-acrylate composition.

15. An optical device comprising said antireflection film formed according to claim 1.

* * * * *